Sept. 14, 1937.  F. A. PIPPIG  2,093,339
INTERNAL COMBUSTION ENGINE
Filed March 12, 1932    3 Sheets-Sheet 1
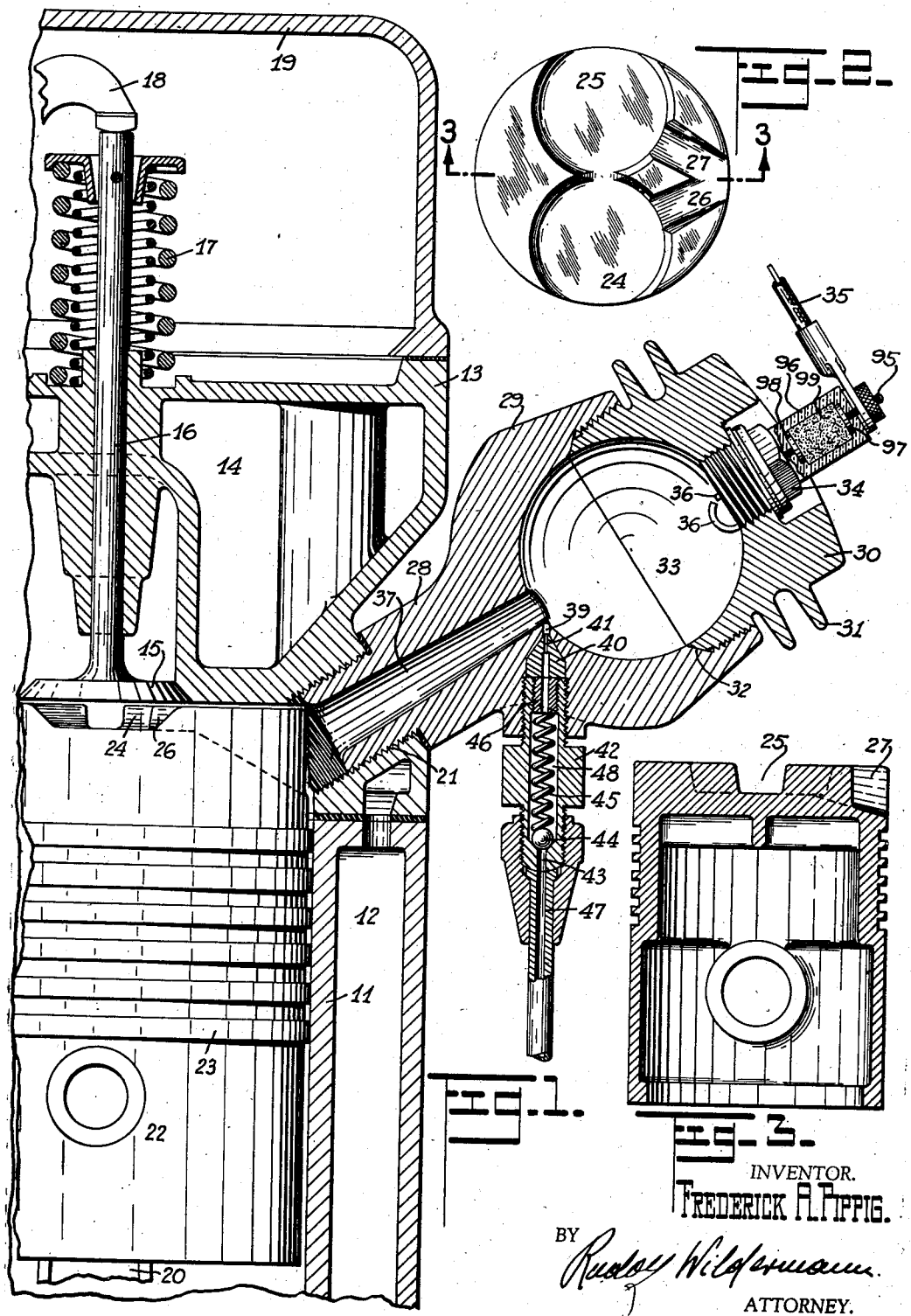
INVENTOR.
FREDERICK A. PIPPIG.
BY
ATTORNEY.

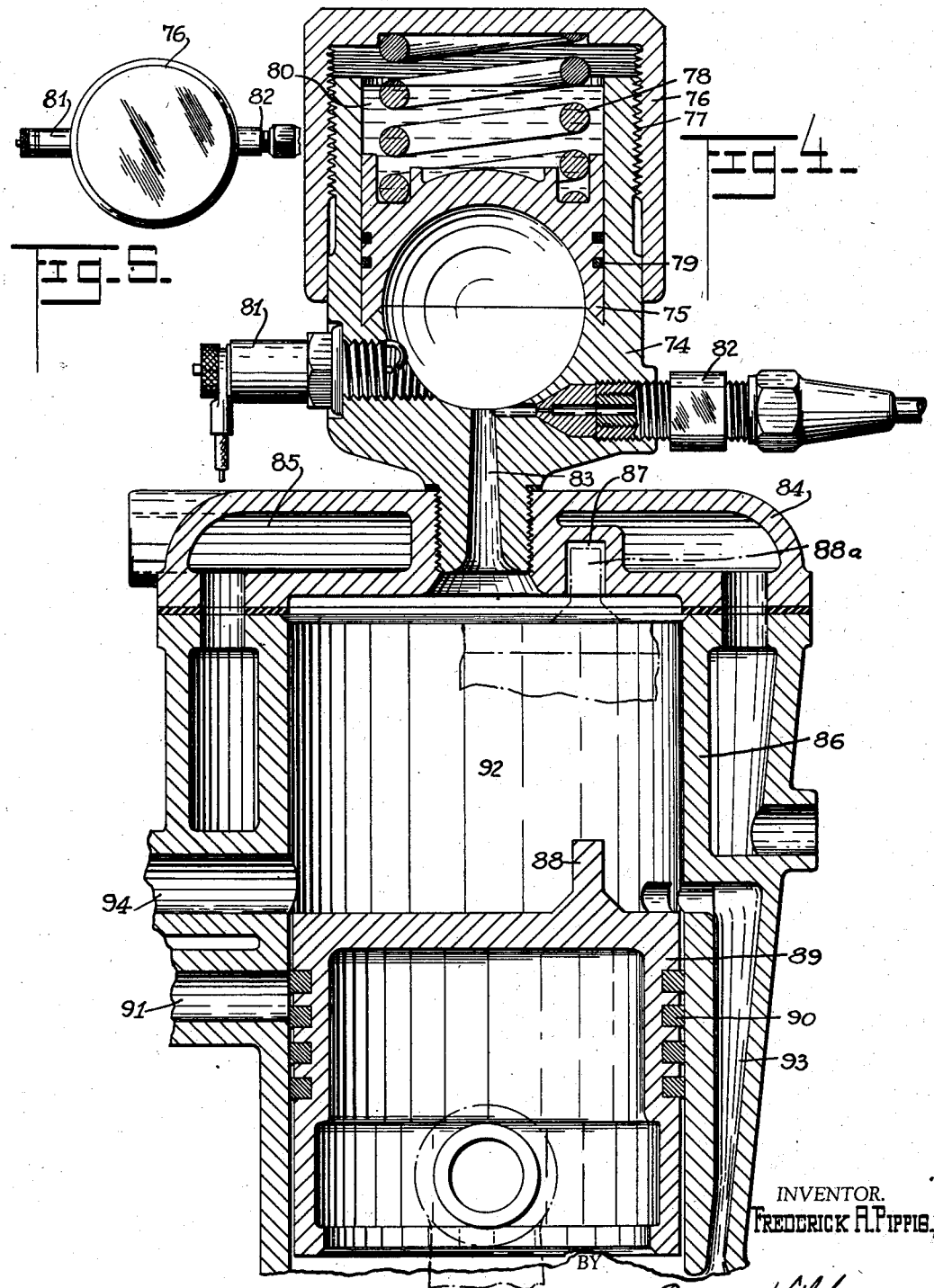

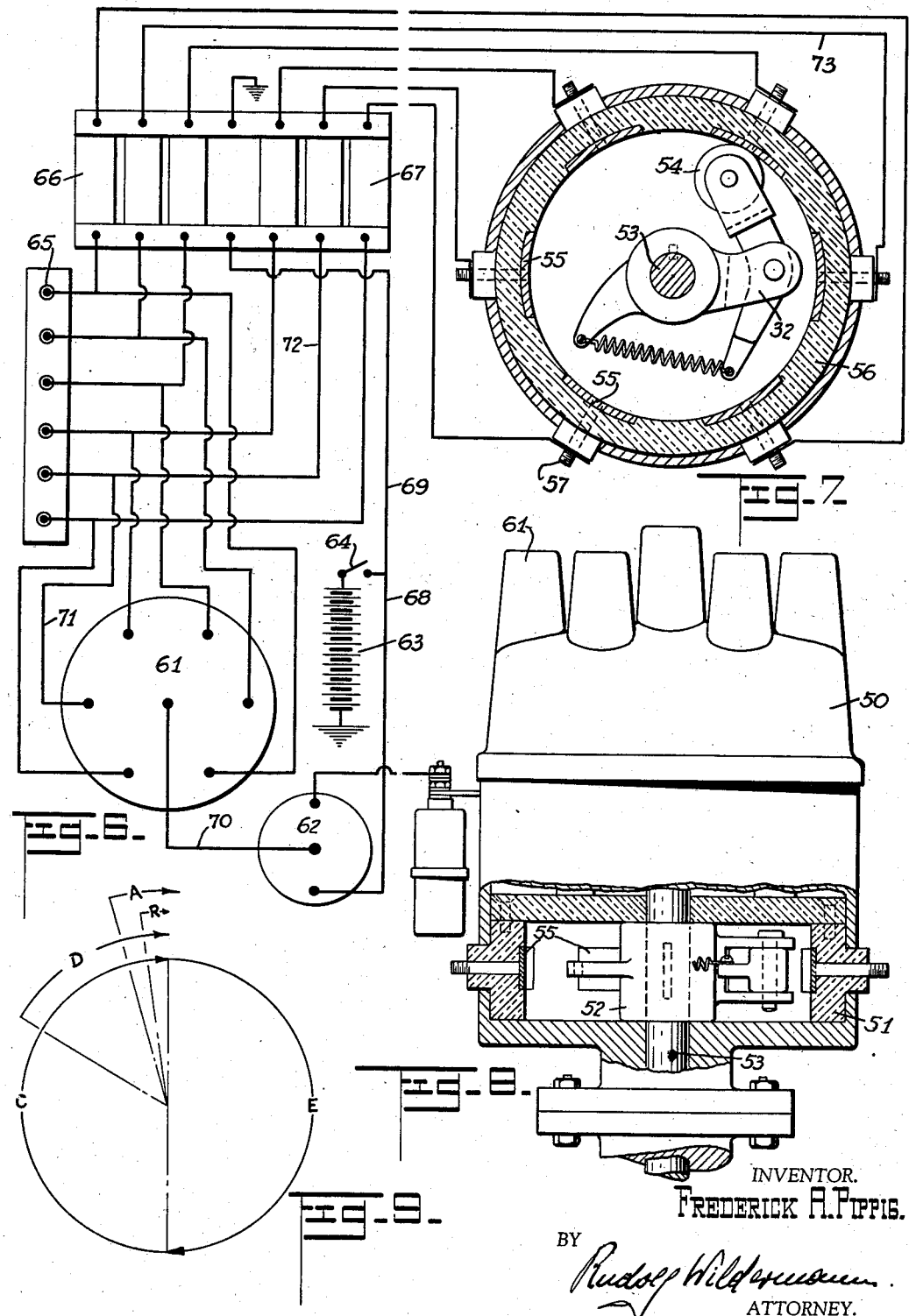

Patented Sept. 14, 1937

2,093,339

UNITED STATES PATENT OFFICE 2,093,339

INTERNAL COMBUSTION ENGINE

Frederick A. Pippig, Paterson, N. J., assignor of one-third to Oilmotors Corporation and two-thirds to Morley Stevens and Thomas Erue, all of New York, N. Y.

Application March 12, 1932, Serial No. 598,331

27 Claims. (Cl. 123—32)

This invention relates to an internal combustion engine for the use of heavier oils.

More particularly I aim to provide by this invention for an engine for heavy oils, which does not have to withstand the very high pressures, which heretofore have been used in connection with engines for heavy oil such as Diesel engines in order to bring about a best satisfactory combustion.

One object of my invention is to condition the combustible atmosphere in an internal combustion engine in such a way that it may be ignited by compression at a lower pressure than would ordinarily be required. My conditioning of the mixture will also facilitate ignition at a lower pressure and with lower temperature by means of ignition means such as an electric spark or a glow plug, as compared with the uses of the prior art.

Another object of my invention is to make use of a pre-ignition chamber in an internal combustion engine, which is connected with a cylinder of the engine, the drop in pressure between the cylinder and the pre-ignition chamber during the compression stroke and the ensuing gas currents being made use of for the volatilization of the fuel.

A further object of this invention is to supply the ignition chamber of an engine with fuel in two stages, the first one by suction, the next stage by solid injection.

Still another object of my invention is to provide simple means for adapting the ordinary gasoline engine for the use of heavy fuels.

Other objects of this invention will become more clear from the following description which relates to the accompanying, exemplary drawings.

The illustrations relate, for the purpose of facilitating a ready understanding, to the adaptation of some of the presently known gasoline engines, such as two-stroke cycle and four-stroke cycle engines, to the use of heavy fuel. To the party versed in automotive engineering it will then be readily understandable that my invention may be applied to even greater advantages if an engine is designed for this particular purpose.

In the drawings, where I have chosen, particularly in Figs. 1, 2, 3, 6, 7, 8, and 9, for purposes of illustration a four-stroke cycle engine of the so-called valve-in-head type, whereas Figs. 4 and 5 have reference to a two-stroke cycle engine:—

Fig. 1 shows the cross-section of part of the cylinder head of a four-stroke cycle engine which has been adapted for my purposes.

Fig. 2 shows the top view of the respective piston.

Fig. 3 shows a corresponding vertical section of the piston.

Fig. 4 shows a cross-section of a two-stroke cycle engine adapted for the use of my invention, the showing being limited, in a manner similar to that of Fig. 1, to the parts which have been changed for the use of my improvements.

Fig. 5 shows a top view of the pre-ignition chamber used in connection with the engine of Fig. 4.

Fig. 6 shows a wiring diagram of a six cylinder, four-stroke cycle engine using my improvements.

Fig. 7 shows an end section of a specially adapted current distributor.

Fig. 8 shows a sectioned elevation of the said distributor, upon which the ordinary distributor of a six-cylinder engine is super-imposed.

Fig. 9 shows, diagrammatically, the compression and explosion cycle of an engine using my improvements.

Similar numerals refer to similar parts throughout the various views.

In Fig. 1 we find the ordinary parts of a cylinder head as follows:—

The cylinder 11, the respective cooling chamber 12, the cylinder head 13, the respective cooling chamber 14, the valves 15, the valve stem 16, the valve spring 17, the valve tappet 18, the cover 19, the connecting rod 20, and the tapped hole 21 into which ordinarily the spark plug is inserted.

The piston 22 is shown to be provided with extra piston rings 23, so as to withstand higher compression. The upper end of the piston 22 is extended, as compared with the ordinary piston head, so that it almost reaches the ceiling of the cylinder in the top center position, as shown. The piston is however shown to be provided with two recesses 24 and 25, which provide clearances for the valves 15. From the said recesses 24 and 25, channels 26 and 27 run towards the side of the piston and are also inclined downward, said channels merging where they open into the tapped hole 21. Into said tapped hole is screwed the neck 28 of the pre-ignition chamber 29. The upper end of the chamber 29 is closed by a plug 30, which is provided with fins 31 for cooling purposes, the tapered lower end 32 of said plug fitting tightly against a correspondingly shaped seat in the chamber 29. The chamber proper 33 may take any suitable or any preferred form; its shape in the drawings is substantially spherical. The plug 30 is provided with a tapped hole in which it receives the spark plug 34, from which a lead connects to the distributor in the customary manner. The points 36 of the spark plug are adjusted to a smaller gap than that ordinarily encountered in gasoline engines, so that the spark may readily pass through a highly compressed gas.

A tapered hole 37 extends through the neck 28 of the pre-ignition chamber 29, the narrower end of said hole opening into the spherical chamber 33. It is understood that the said hole 37 faces the merged channels 26 and 27 of the piston 22, when the latter is in the top center position. At the point, where the opening 37 issues upon chamber 33, there is also provided a small hole 39, which substantially merges with the margin of hole 37, and which is disposed at an incline in respect thereto. The hole 39 is enlarged backwardly in order to accommodate the atomizer nozzle 40 which is provided with a very fine opening 41 issuing through hole 39 upon chamber 33. The nozzle 40 is forced into its seat by means of a coupling 42, which is screwed into the enlarged outer entrance of hole 39.

The coupling 42 is developed as a check valve. For that purpose it has a narrow inlet 43 on its lower end, onto which a ball 44 is pressed by a spring 45, which is retained in the coupling by a bushing 46. The bushing 46 is screwed into the upper end of coupling 42 and by a change of its position, the tension applied by spring 45 on ball 44 may be adjusted. To the lower end of coupling 42 is connected a conduit 47, said connection and said conduit being chosen to withstand heavy pressures. The conduit 47 connects to a fuel-pump, not shown, which is actuated by the cam shaft of the engine, and which, in the manner known in Diesel type engines, injects predetermined portions of heavy oil through the chamber 48 into the spherical chamber 33. The automotive art knows a number of fuel pumps for this purpose, all of which are provided with control means, by means of which the operator of the engine may adjust the quantity of fuel injected at the beginning of each explosion stroke or at the end of the compression stroke. The control means of these pumps also comprise ordinarily used control means, which serve to bring about an earlier injection of the fuel at higher speeds, i. e., when greater quantities of fuel are injected.

The device of Fig. 1 functions in the following manner: The valves 15 may function in exactly the same manner as in the case of the ordinary gas engine. Through the intake valve I supply, however, air, possibly cleaned air, or compressed air, instead of a gasoline-air mixture. The burned fuel is exhausted through the exhaust valve in the common manner.

Upon the intake stroke air enters upon the cylinder through the intake valve. On account of the particular shape of the piston it is highly compressed with great turbulence during the compression stroke and is driven through the tapered hole 37, into the spherical chamber 33. The tapered hole 37 acts in the manner of a Venturi tube, the air propelled therethrough reaching its highest speed when issuing upon the spherical chamber 33. Due to this speed of flow of the air a sucking action is set up in respect to the fuel contained in chamber 48,—the fuel which has remained therein after the last injection. The said fuel is allowed to follow said action, since the suction may lift up the ball 44 against the pressure of spring 45 so that the air rushing through hole 37 atomizes or vaporizes the fuel sucked out of hole 39 and sprays it as a fog or as a vapor into the spherical chamber 33.

The electric means now become active as will be explained later.

Shortly before the end of the compression stroke, the fuel-pump positively injects the required part of fuel through the nozzle 41, into the chamber 33 and the ignition spark jumps at the same time across the gap at points 36, and it ignites the mixture in the pre-ignition chamber. The burning gases are propelled into the top of cylinder 11 through hole 37 and channels 26 and 27, so that the piston 22 is now pressed down during the explosion stroke. The explosion stroke is followed by the customary exhaust stroke, during which the burnt gases contained in the cylinder 11 are swept out by way of the exhaust valve 15.

Fig. 9 shows diagrammatically two strokes of a four-stroke cycle six-cylinder engine which was used during tests. The compression stroke C from the bottom dead center to the top dead center is shown to the left, the explosion stroke E is shown to the right. A continuous high tension "cold" discharge D passes through the pre-ignition chamber at the terminals of the spark plug during part of the compression stroke. In the test case of the drawings the said discharge was applied during the last third of the compression stroke as indicated by an arrow head extending over 60°. Whereas the fuel is supplied from the chamber 48 due to suction of the air rushing through hole 37 at times when the rush of said air is strongest during the compression stroke, the positive injection of the balance of the required fuel under pressure takes place at a definite point of time near the end of the compression stroke in the manner known in Diesel engines, the start of said injection being timed as described above. The advanced injection period used in the test case during operation at the full speed is termed A in Fig. 9 and extended from 7° before dead top center to about 5° beyond dead top center; the retarded injection R for operation at low speed extended over approximately 4°, and terminated at the dead top center. The timing of the injection was suitably connected with the timing of the ignition spark so that the latter took place simultaneously with the beginning of the injection. In other words the mechanical controls used in connection with a Diesel engine for the injection of the fuel and the control of the distributor head as used in gasoline engines were aggregated to facilitate a common control.

The manner of applying a non-igniting electric charge and the igniting spark according to the foregoing description, may be explained by Figs. 6, 7, and 8. Fig. 8 shows the commonly used distributor head 50 superimposed upon a current distributor 51. The wiping member 52 of the latter is mounted upon the shaft 53 of the distributor head and grounded thereby; a contact roller 54 attached to the wiping member 52 contacts in rotation with the segments 55, which are insulatedly mounted in the wall 56 of the current distributor, and which comprise binding posts 57 extending to the outside of the distributor housing for purposes of electrical connections.

Since the distributor is actuated by the cam shaft, the segments 55, each of which extends over one twelfth of the circumference of the inside of the distributor housing will allow an electrical connection during the period D of the diagram of Fig. 9.

The diagram of Fig. 6 comprises the following known parts of automotive ignition equipment:— The distributor head 61, a (booster) coil 62, a battery 63, ignition switch 64, the six spark plugs 65 of an engine, and a vibrating coil 66 which is constructed exemplarily on the principle of "master" coils in which a central vibrator (not shown) supplies the interruptions for the current in the six high tension coils 67.

Two parallel connections 68 and 69 lead from the ignition switch 64 to the booster coil 62 and the vibrator coil 66 respectively. The current passing through lead 68 serves to set up the ignition spark in the commonly known manner, so that the high tension passing from coil 62 to distributor 61 through lead 70, is, under advance or retard control, supplied by means of the leads 71 to the spark plugs 65 of the different cylinders of the engine. The current passing through the lead 69 actuates the vibrating coil 66, and high tension currents pass from said vibrating coil through leads 72 to the spark plugs 65, for the periods during which the respective coils 67 are excited by way of the leads 73 during the period of contact between rollers 54 with the respective segment 55. It is understood that the last mentioned period may suitably be arranged to supply during any period of the compression stroke and that the respective periods may be made shorter or may be made longer by making segments 55 shorter or longer. If the discharge from the ignition coil 66 is to be applied during a very long period of the compression stroke, the segments 55 may overlap, for instance by vertically offsetting adjoining ones of said segments.

Whereas the high tension current supplied from the booster coil 62 is strong enough to cause ignition of the heavy fuel mixture, the charge supplied from the coil 66 is not hot enough to ignite, but provides a continuous "cold" ionizing discharge between the points 36 of the spark plug, while roller 56 contacts with the respective segment 55. Exhaustive tests were carried through with the exemplary equipment shown in the drawings, and a perfect combustion under full load and idling operation of a 125 horse power engine was attained between a low speed of 250 R. P. M. and a high speed of 2500 R. P. M. of the engine, when the cylinder and the pre-ignition chamber 49 were so proportioned that the compressed charge in the pre-ignition chamber had a pressure of 280 lbs. at low speed, and a pressure of 480 lbs. at a high speed.

Since the application of an ionizing charge makes unnecessary the use of higher pressures before ignition the pressure set up by the combustion is correspondingly relieved so that the engine is not subjected at any time to excessive strains. For that purpose provisions may be made to allow for expansion of the pre-ignition chamber at highest speeds, as it has been exemplarily illustrated in connection with the showing of Fig. 4. In this instance the pre-ignition chamber comprises a housing 74 in which is vertically slidably arranged the part 75 forming the other half of the pre-ignition chamber. A cap 76 is adjustably extended over the housing 74, being engaged thereupon by threads 77, and a compression spring 78 extends between the bottom of cap 76 and a suitable groove in the top of part 75, normally retaining the part 75 in position shown in the drawings. Suitable packing means 79 seal the part 75 against the wall of the housing 74, and the space above part 75 may be filled with a suitable cooling medium 80.

Figs. 4 and 5 show the spark plug 81 to extend into the pre-ignition chamber from one side whereas the fuel is supplied upon the other side through conduit 82.

Whereas in the arrangement of Fig. 1 the spark plug was arranged substantially opposite to the point at which compressed air issues into the chamber and atomizes part of the fuel, so that the mixture is whirled onto the spark plug, I also attain satisfactory results by an arrangement in accordance with Figs. 4 and 5, in which the entrance hole 83 of the air is located between the spark plug 81 and the fuel conduit 82, the latter one issuing substantially normally to said hole 83 into the chamber, the hole 83 facing conduit 82 in suction-atomizer fashion.

The pre-ignition chamber of Fig. 4 is shown to be attached to the cover 84 of a two-stroke cycle marine engine, said chamber being screwed into the opening, which ordinarily serves to receive the spark plug. The cover 84 is provided with cooling chamber 85 connecting to the cooling chamber of the cylinder 86 in the manner well known to those acquainted with this art. The bottom side of the cover shows however a recess 87, which serves to receive the baffle plate 88 mounted on top of the piston 89. The piston 89 differs from those ordinarily used for two-cycle engines inasmuch as it allows greater compression as indicated by a greater number of piston rings 90 and inasmuch as it is upwardly elongated, so that the space above the piston, when in a dead top center position, is suitably reduced in order to allow a greater compression of the air. The clearance 87 is therefore provided in the cover 84 in order to allow the plate 88 to enter thereupon, as indicated at 88a.

The operation of the engine is different from that of the ordinary gasoline engine inasmuch as air is supplied instead of an explosive mixture through the intake 91 into the crank case below the piston 89, when the piston is in a high position. The air which is compressed in the crank case passes therefrom into the chamber 92, through a channel 93 in the cylinder wall 86, when the piston is in its lowest position. The exhaust takes place during the exhaust stroke through the opening in 94, in exact agreement with gasoline engine practice.

A preferred construction of the spark plug 34 is indicated in Fig. 2. The center lead 95, instead of passing right through the commonly known insulating cup 96, terminates right below the upper end of said cup, facing the interior thereof by means of a metallic disc 97 at its end, and a similar disc 98 is provided upon the bottom of cup 96, and connects to one of the discharge terminals 36 upon the inside of the pre-ignition chamber. Between the discs 97 and 98 I arrange a mixture of fine parts of a conductor with insulating material. Aluminum filings interspersed with asbestos powder may for instance be used as indicated at 99. The showing is perhaps not quite clear in respect to the proportioning of the fine conducting parts with the insulating parts; of course there are so many conductor parts, as to allow,—at times,—a continuous metallic connection between the plates 97 and 98. Using this arrangement in the high tension circuit I have attained a better and adjusted flow of currents as indicated by complete combustion at various speeds of the engine. The arrangement of cup 96 may be replaced by suitable parts in the high tension discharge circuit which assist in producing an oscillatory high frequency discharge for ionizing the lean fuel mixture.

It is significant that under the condition of the above described tests the igniting spark could be cut off after a short period of operation of an engine, the ionized charge fulminating itself at the time of injection of the fuel, the engine then functioning in exactly the same manner without an igniting spark as it had previously functioned when ignited by a spark.

While I have shown and described my invention with some degree of particularity, it will be realized that other modifications and changes may be resorted to under special conditions. I therefore do not wish to be limited and restricted to the exact details shown and described, but reserve the right to make such changes and modifications as may fairly fall within the scope of the subject matter now being claimed.

What I claim is:—

1. In combination with an internal combustion engine, a pre-ignition chamber communicating with the compression chamber of said engine by a hole through which the charge compressed in said compression chamber rushes in said pre-ignition chamber, high tension means arranged in said pre-ignition chamber and subjecting a charge arriving therein by way of said hole to an electric charge, a fuel conduit issuing upon said pre-ignition chamber near the hole, and a check-valve closing said conduit at a point removed from where it issues upon said pre-ignition chamber, so that predetermined fuel contents of part of said conduit are available for suction into said pre-ignition chamber by said in-rush through said hole.

2. In combination with an internal combustion engine, a pre-ignition chamber communicating with the compression chamber of said engine by a hole through which the charge compressed in said compression chamber rushes into said pre-ignition chamber, high tension means arranged in said pre-ignition chamber and subjecting a charge arriving therein by way of said hole to an electric charge, a fuel conduit through which fuel is injected into and issuing upon said pre-ignition chamber at an acute angle relatively to and next to said hole in atomizer relationship, and a check valve interposed in said conduit near its point of issue upon said pre-ignition chamber.

3. In combination with an internal combustion engine, a pre-ignition chamber communicating with the compression chamber of said engine by a tapered hole through the smallest end of which the charge compressed in said compression chamber rushes in said pre-ignition chamber, high tension means arranged in said pre-ignition chamber and subjecting a charge arriving therein by way of said hole to an electric charge, a fuel conduit, and means closing off a section of said conduit, said section opening upon said pre-ignition chamber, so that a predetermined part of the fuel contents of said section of said conduit are sucked into said pre-ignition chamber by said in-rush through said hole.

4. In combination with an internal combustion engine, a pre-ignition chamber communicating with the compression chamber of said engine by a hole through which the charge compressed in said compression chamber rushes into said pre-ignition chamber, high tension means arranged in said pre-ignition chamber and subjecting a charge arriving therein by way of said hole to an electric charge, a fuel chamber issuing upon said pre-ignition chamber, so that the fuel contents of said chamber are sucked into said pre-ignition chamber by said in-rush through said hole, an injector conduit communicating with said fuel chamber, a check valve between said fuel chamber and said conduit, and tension means closing said valve against the suction set up by the charge rushing through said hole.

5. The method of providing combustion in an ignition chamber comprising introducing air into said chamber under pressure, subjecting said air arriving in said chamber to a continuous electrical discharge, sucking a predetermined amount of fuel into and volatilizing it in the chamber by the in-rush of air thereinto thus providing a charge therein, igniting said charge, and finally injecting additional fuel into said chamber under pressure.

6. The method of conditioning the fuel-air charge in an internal combustion engine, comprising subjecting said charge in the chamber in which it is to be ignited to a high-tension discharge for a predetermined period prior to ignition.

7. The method of providing a combustible charge in an ignition chamber comprising, introducing air into said chamber under pressure, sucking a fuel into and volatilizing it in the chamber by the in-rush of air thereinto, subjecting for a predetermined period of time the fuel-air mixture in said chamber to a high-tension discharge, igniting it, and finally injecting fuel into said chamber under pressure.

8. The method of providing a combustible charge in a pre-ignition chamber attached to an internal combustion engine comprising, forcing by said engine air into said chamber under pressure, sucking a fuel into and volatilizing it in the chamber by the in-rush of air thereinto, subjecting the fuel-air mixture in said chamber to a high-tension discharge for conditioning said mixture, igniting said mixture, and finally injecting additional fuel into said chamber under pressure.

9. The method of preparing a combustible charge in an internal combustion engine, comprising subjecting a gas mixture in said engine to a high tension discharge, fulminating said mixture, and injecting a fuel into said gas mixture.

10. The method of preparing a combustible charge in an internal combustion engine, comprising atomizing fuel by air-rushing in the engine, subjecting the fuel air charge to a protracted high tension discharge, igniting the charge and injecting a fuel into the ignited charge.

11. In combination with the ignition chamber of an internal combustion engine, a source of high tension current, means discharging said current in said ignition chamber through a charge introduced into said engine for a predetermined period of time prior to ignition, and means applying a current of higher intensity than the said current for igniting said charge.

12. In combination with an internal combustion engine and the atmosphere comprised in the charge to be ignited in said engine, a source of high tension current, means discharging said current through said atmosphere for a predetermined period of time during the compression stroke, and means igniting said charge substantially at the end of said stroke.

13. In combination with the spark plug of an internal combustion engine, means applying a continuous, high tension current to said spark plug during a period of time preceding ignition, and means momentarily impressing a high tension current upon said spark plug of greater intensity than said continuous high tension current in order to bring about ignition.

14. The method of conditioning the fuel-air charge in an internal combustion engine, comprising subjecting said charge to a high-tension discharge for a predetermined period prior to ignition; and introducing additional fuel into said charge after ignition.

15. The method of conditioning the fuel-air charge in an internal combustion engine, comprising subjecting said charge to a high-tension discharge for a predetermined period prior to ignition, and then igniting said charge and introducing additional fuel thereinto.

16. Method of providing a combustible charge in an internal combustion engine, comprising ionizing an atmosphere of a lean mixture in said engine while it is being uniformly constituted, and introducing a supplementary jet of fuel into said ionized atmosphere.

17. Method of providing a combustible charge in an internal combustion engine, comprising uniformly building up an atmosphere of a lean mixture in said engine, ionizing said atmosphere, and introducing a supplementary jet of fuel into and substantially simultaneously igniting said ionized atmosphere.

18. Method of operating an internal combustion engine, by first setting up therein a lean, ionized charge, and by then igniting said charge and introducing additional fuel.

19. The method of charging a chamber of an internal combustion engine with a heavy fuel, comprising preparing in said chamber a fulminating charge comprising an ionized lean mixture of said fuel with air, and of then introducing a solid jet of said fuel substantially while said charge is being fulminated.

20. The method of charging a chamber of an internal combustion engine with a heavy fuel, comprising preparing in said chamber a fulminating charge by vaporizing part of the fuel charge in the air charge and by ionizing said mixture, and by introducing the rest of the fuel charge as a solid jet substantially while the mixture is being fulminated.

21. In combination with the cylinder of an internal combustion engine, a pre-ignition chamber, a vent connecting said cylinder with said chamber, a fuel conduit issuing upon said chamber in atomizer relationship with said vent, a valve in said conduit and spaced relatively to said chamber, so that a predetermined amount of fuel is available in said conduit between said valve and said chamber, means chronologically separated by controlling flow through said vent and injection through said conduit and electric discharge means in said pre-ignition chamber for electrically charging the contents of said chamber.

22. In combination with the cylinder of an internal combustion engine, a pre-ignition chamber, a vent connecting said cylinder with said chamber, a fuel conduit issuing upon said chamber in atomizer relationship with said vent, a valve in said conduit and spaced relatively to said chamber, so that a predetermined amount of fuel is available in said conduit between said valve and said chamber, means chronologically separated by controlling flow through said vent and injection through said conduit and electric discharge means in said pre-ignition chamber for electrically charging the contents of said chamber.

23. In combination with an internal combustion engine, a pre-ignition chamber communicating with the compression chamber of said engine by way of a hole through which the charge compressed in said compression chamber rushes into said pre-ignition chamber, a fuel injector nozzle issuing upon said pre-ignition chamber next to said hole in suction-atomizer relationship, a fuel conduit communicating with said nozzle, a chamber interposed between said nozzle and conduit and dimensioned to hold the fuel to be atomized, a valve means normally closing said chamber toward said conduit, and means for electrically charging the contents of said pre-ignition chamber.

24. The method of providing a combustible charge in a pre-ignition chamber attached to an internal combustion engine comprising, forcing by said engine air into said chamber under pressure, sucking a predetermined amount of fuel into and volatilizing it in the chamber by the in-rush of air thereinto thus providing a charge therein, passing through said charge a high-frequency discharge, and finally injecting additional fuel into said chamber under pressure.

25. The method of providing a combustible charge in a pre-ignition chamber attached to an internal combustion engine comprising, forcing by said engine air into said chamber under pressure, sucking a predetermined amount of fuel into and volatilizing it in the chamber by the in-rush of air thereinto thus providing a charge therein, continuously passing through said charge a high-frequency discharge, and finally injecting additional fuel into said chamber under pressure.

26. Method of operating an internal combustion engine, by first cyclically setting up a lean, ionized charge, igniting said charge by an electric spark and then introducing additional fuel.

27. Method of operating an internal combustion engine, by first cyclically setting up a lean, ionized charge, igniting said charge by an electric spark and introducing additional fuel, while the engine is being warmed up, and by then omitting the spark ignition during continued operation.

FREDERICK A. PIPPIG.